Patented Dec. 25, 1951

2,580,300

UNITED STATES PATENT OFFICE 2,580,300

POLYALKYL BENZOPHENONE MIXTURE

Herbert L. Johnson, Media, and Archibald P. Stuart, Norwood, Pa., assignors to Sun Oil Company, Philadelphia, Pa., a corporation of New Jersey No Drawing. Application August 12, 1949, Serial No. 110,042

4 Claims. (Cl. 260—591)

This invention relates to a method for the preparation of a novel plasticizer and to the product thereby obtained.

According to the invention there is prepared a mixture of polyalkylated benzophenones by treating an essentially aromatic hydrocarbon fraction boiling substantially through the range 300° F.–400° F. with phosgene in the presence of aluminum chloride. The product of the invention also can be prepared from a petroleum fraction containing aromatics and other constituents and boiling substantially through the recited temperature range in which case the paraffinic and naphthenic constituents of said fraction behave as an inert diluent. The aromatics normally present in such a petroleum fraction are: ortho-xylene, meta-xylene, para-xylene, ethylbenzene, m-ethyltoluene, o-ethyltoluene, propylbenzene, cumene, mesitylene, pseudocumene, hemimellitene, $C_{10}$ aromatics. These aromatics can be separated from the petroleum fraction by known means, for example by the silica gel adsorption-desorption technique as described in U. S. Patent No. 2,398,101.

The reaction will take place at room temperature. Conventional apparatus may be employed. However, it is necessary to guard the operator against the possible effects of phosgene.

The following examples illustrate the invention.

Example I

A mixture of 3000 grams of petroleum spirits containing 18% aromatic hydrocarbons, and 300 grams (2.25 mols) of anhydrous aluminum chloride was stirred at 20° C. while 154 grams (1.6 mols) of phosgene was passed in over a period of three and one half hours. The reaction mixture was stirred for four additional hours at 20° C. and hydrolyzed by pouring on ice and hydrochloric acid. The organic layer was separated, dried, and distilled yielding 2463 grams of recovered petroleum spirits containing 8.9% aromatics, 72 grams of a low boiling cut, boiling range 80–200° C. (4 mm. Hg) 239 grams of the desired product, boiling range 200° C.–250° C. (4 mm. Hg) and leaving 28 grams of a dark viscous distillation residue.

Analysis of the plasticizer product showed that it had the carbon and hydrogen content of a ketone containing an average of two $C_9$ aromatic groups.

Calc. for $C_{19}H_{22}O$: C, 85.66, H, 8.33;
Found: C, 85.56±0.08, H, 8.30±0.09.

The product of the invention is a pale yellow oily material boiling through the range of 200° C.–250° C. (392° F.–482° F.) at 4 mm. Hg.

Example II

A mixture of 240 grams of aromatic hydrocarbons derived from petroleum spirits, 250 milliliters of carbon disulfide and 133 grams (1 mol) of aluminum chloride was stirred at 20° C.–25° C. for forty-five minutes while phosgene gas was passed at a rate of approximately 300 milliliters/minute. After stirring for four additional hours the reaction mixture was hydrolyzed. On working up the reaction mixture as previously described, there was obtained 40 grams of recovered aromatics, 45 grams of the lower boiling material, 133 grams of the plasticizer and 12 grams of distillation residue.

The product of the invention is particularly useful as a plasticizer for polyvinyl resins. Since it is compatible with other plasticizers for polyvinyl resins, e. g. dioctyl phthalate, the product of the invention may be used as a plasticizer, either alone or in admixture with such other plasticizers.

In copending application for patent Serial No. 110,043 filed August 12, 1949, by the instant inventors there is described and claimed a polyvinyl resin in plasticized composition with the polyalkylated benzophenones of this invention.

We claim:

1. The method of preparing a mixture of polyalkylated benzophenones which comprises treating a petroleum hydrocarbon fraction comprising aromatics and saturated constituents and boiling substantially through the range 300° F.–400° F. with phosgene in the presence of aluminum chloride; hydrolyzing the reaction products; and recovering from the hydrolyzed reaction products a fraction boiling substantially through the range 392–482° F. at 4 mm. Hg and comprising essentially diaryl ketones having an average of 19 carbon atoms per molecule.

2. The method of preparing a mixture of polyalkylated benzophenones which comprises treating an essentially aromatic hydrocarbon fraction boiling substantially through the range 300° F.–400° F. with phosgene in the presence of aluminum chloride; hydrolyzing the reaction products; and recovering from the hydrolyzed reaction products a fraction boiling substantially through the range 392–482° F. at 4 mm. Hg and comprising essentially diaryl ketones having an average of 19 carbon atoms per molecule.

3. The mixture of polyalkylated benzophenones obtained by treating a petroleum hydrocarbon fraction comprising aromatics and saturated constituents and boiling substantially through the range 300° F.–400° F. with phosgene in the presence of aluminum chloride, said mixture boiling through the range 392° F.–482° F. at 4 mm. Hg, and comprising essentially diaryl ketones having an average of 19 carbon atoms per molecule.

4. The mixture of polyalkylated benzophenones obtained by treating an essentially aromatic hydrocarbon fraction boiling substantially through the range 300° F.–400° F. with phosgene in the presence of aluminum chloride, said mixture boiling through the range 392° F.–482° F. at 4 mm. Hg, and comprising essentially diaryl ketones having an average of 19 carbon atoms per molecule.

HERBERT L. JOHNSON.
ARCHIBALD P. STUART.

REFERENCES CITED

The following references are of record in the file of this patent:

UNITED STATES PATENTS

| Number | Name | Date |
|---|---|---|
| 1,866,717 | Meyer | July 12, 1932 |
| 2,075,765 | Ralston et al. | Mar. 30, 1937 |

OTHER REFERENCES

Thomas, "Anhydrous Aluminum Chloride in Organic Chemistry," pages 233–234, Copyright 1941, by Reinhold Publishing Corp., New York.